United States Patent
Nakade

(10) Patent No.: US 10,969,005 B2
(45) Date of Patent: Apr. 6, 2021

(54) CONTROL SYSTEM FOR VEHICLE

(71) Applicant: TOYOTA JIDOSHA KABUSHIKI KAISHA, Toyota (JP)

(72) Inventor: Yusuke Nakade, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/704,214

(22) Filed: Dec. 5, 2019

(65) Prior Publication Data
US 2020/0217414 A1  Jul. 9, 2020

(30) Foreign Application Priority Data

Jan. 8, 2019 (JP) .............................. JP2019-001473

(51) Int. Cl.
| | |
|---|---|
| *F16H 59/50* | (2006.01) |
| *F16H 63/48* | (2006.01) |
| *F16H 61/02* | (2006.01) |
| *F16H 59/10* | (2006.01) |
| *F16H 63/34* | (2006.01) |

(52) U.S. Cl.
CPC ............. *F16H 59/50* (2013.01); *F16H 63/48* (2013.01)

(58) Field of Classification Search
CPC ...... F16H 59/50; F16H 63/48; F16H 61/0204; F16H 59/105; F16H 63/3416; B60T 7/12
See application file for complete search history.

(56) References Cited

U.S. PATENT DOCUMENTS

| | | | |
|---|---|---|---|
| 9,145,126 B2* | 9/2015 | Kinoshita ............. | B60W 10/10 |
| 9,506,558 B2* | 11/2016 | Fujiyoshi ............... | B60K 28/12 |
| 10,300,892 B2* | 5/2019 | Delannoye ............. | B60T 1/005 |
| 2015/0057870 A1* | 2/2015 | Lee ....................... | B60W 30/06 |
| | | | 701/23 |
| 2016/0298758 A1 | 10/2016 | Fujiyoshi et al. | |
| 2017/0129465 A1 | 5/2017 | Ozawa et al. | |
| 2017/0297577 A1 | 10/2017 | Tsuji et al. | |

FOREIGN PATENT DOCUMENTS

| | | |
|---|---|---|
| CN | 106715978 A | 5/2017 |
| CN | 107023676 A | 8/2017 |
| JP | 2007-170546 A | 7/2007 |
| JP | 2016-199104 A | 12/2016 |
| JP | 2017-122495 A | 7/2017 |

* cited by examiner

*Primary Examiner* — Tinh Dang
(74) *Attorney, Agent, or Firm* — Oblon, McClelland, Maier & Neustadt, L.L.P.

(57) ABSTRACT

A control system for a vehicle including a power transmission system and a switching device has an electronic control unit configured to make a door open-close determination as to whether a door of the vehicle is open or closed, using an open-close signal indicating opening or closing of the door, and execute automatic parking control by causing the switching device to switch the power transmission system to the parking state, when the door open-close determination indicates that the door is open, while the vehicle is stopped with the power transmission system placed in the non-parking state. The electronic control unit determines that the door is open, when the open-close signal generated from at least one of a plurality of sensors provided for the same door changes from a close signal to an open signal.

7 Claims, 5 Drawing Sheets

FIG. 2

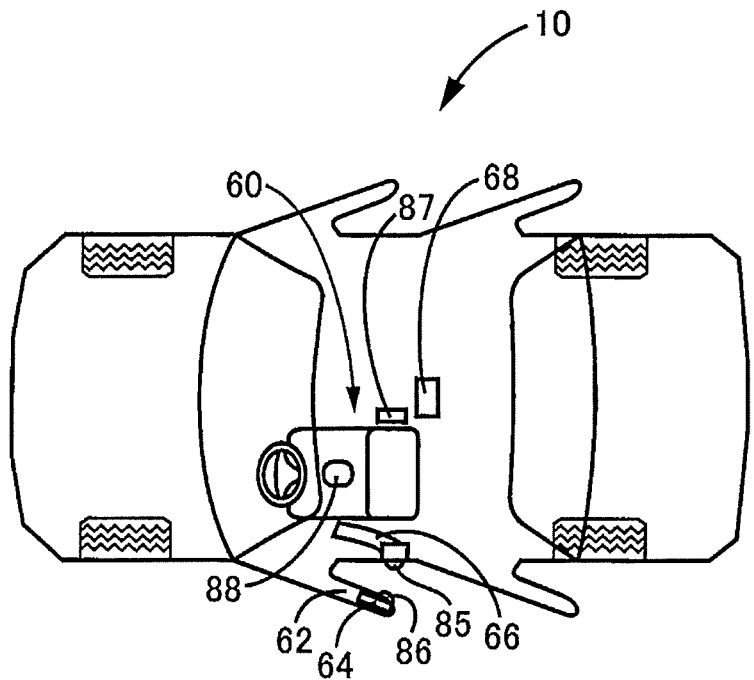

FIG. 3

|  | ACTUAL DOOR STATE | LOCK SW SIGNAL | COURTESY SW SIGNAL | DOOR OPEN-CLOSE DETERMINATION |
|---|---|---|---|---|
| NORMAL | CLOSE→OPEN | CLOSE→OPEN | CLOSE→OPEN | OPEN |
|  | OPEN→CLOSE | OPEN→CLOSE | OPEN→CLOSE | CLOSE |
| LOCK SW STUCK OPEN | CLOSE→OPEN | OPEN | CLOSE→OPEN | OPEN |
|  | OPEN→CLOSE | OPEN | OPEN→CLOSE | CLOSE |
| LOCK SW STUCK CLOSED | CLOSE→OPEN | CLOSE | CLOSE→OPEN | OPEN |
|  | OPEN→CLOSE | CLOSE | OPEN→CLOSE | CLOSE |
| COURTESY SW STUCK OPEN | CLOSE→OPEN | CLOSE→OPEN | OPEN | OPEN |
|  | OPEN→CLOSE | OPEN→CLOSE | OPEN | CLOSE |
| COURTESY SW STUCK CLOSED | CLOSE→OPEN | CLOSE→OPEN | CLOSE | OPEN |
|  | OPEN→CLOSE | OPEN→CLOSE | CLOSE | CLOSE |

CONTROL SYSTEM FOR VEHICLE

INCORPORATION BY REFERENCE

The disclosure of Japanese Patent Application No. 2019-001473 filed on Jan. 8, 2019 including the specification, drawings and abstract is incorporated herein by reference in its entirety.

BACKGROUND

1. Technical Field

The disclosure relates to a control system for a vehicle, which switches a power transmission system between a parking state and a non-parking state, based on a control command signal.

2. Description of Related Art

A control system for a vehicle including a power transmission system that transmits power of a power source to drive wheels, and a switching device that switches the power transmission system between a parking state in which rotation of a rotary member that rotates with the drive wheels is mechanically inhibited, and a non-parking state in which rotation of the rotary member is permitted, based on a control command signal, is widely known. One example of the control system of this type is described in Japanese Unexamined Patent Application Publication No. 2016-199104 (JP 2016-199104 A). In the system disclosed in JP 2016-199104 A, when it is determined that operation to open a door of the vehicle is performed, based on detection data of a door sensor, while the vehicle is stopped with a shift position that determines a transmitting state of a power transmission mechanism being in a traveling range that permits traveling of the vehicle, it can be presumed that an occupant will then get out of the vehicle; therefore, the shift position is set to a non-traveling range in which the vehicle is unable to travel, for example, a parking range in which a parking lock mechanism is activated so as to lock rotation of a drive shaft.

SUMMARY

In the case where the vehicle has the function of executing automatic parking control for switching the power transmission system to the parking state by use of the switching device when the door open-close determination indicates that the door is open, while the vehicle is stopped with the power transmission system placed in the non-parking state, there may be some drivers who routinely open the door so as to switch the power transmission system to the parking state. Thus, it is desired to improve the reliability of the automatic parking control. Meanwhile, when opening/closing of the door of the vehicle is detected by using a single sensor, as described in JP 2016-199104 A, the system does not determine that the door is open, even if the driver opens the door, if the sensor is stuck in a sensor close state corresponding to a state in which the door is closed. In order to improve the reliability of automatic parking control, the system is desired to appropriately make the door open-close determination to determine that the door is open.

The disclosure provides a control system for a vehicle, which can improve the reliability of automatic parking control.

A control system for a vehicle is provided according to one aspect of the disclosure. The vehicle includes a power transmission system that transmits power of a power source to drive wheels, and a switching device that switches the power transmission system between a parking state in which rotation of a rotary member that rotates with the drive wheels is mechanically inhibited, and a non-parking state in which rotation of the rotary member is permitted, based on a control command signal. The control system includes an electronic control unit configured to make a door open-close determination to determine whether a door of the vehicle is open or the door is closed, using an open-close signal indicating opening or closing of the door. The electronic control unit is configured to execute automatic parking control by causing the switching device to switch the power transmission system to the parking state, when the door open-close determination indicates that the door is open, while the vehicle is stopped with the power transmission system placed in the non-parking state. The electronic control unit is configured to determine that the door is open as the door open-close determination, when the open-close signal generated from at least one of a plurality of sensors provided for the same door changes from a close signal indicating that the door is closed, to an open signal indicating that the door is open, the plurality of sensors being configured to detect opening or closing of the same door, and to generate the open-close signal.

According to the above aspect of the disclosure, the electronic control unit determines that the door is open, when the open-close signal generated by at least one of the two or more sensors provided for the same door changes from the close signal indicating that the door is closed, to the open signal indicating that the door is open. Thus, even when one sensor is stuck in a sensor close state corresponding to the door closed state, the electronic control unit can appropriately determine that the door is open. Accordingly, the automatic parking control is executed with improved reliability, using the door open-close determination indicating that the door is open.

In the control system as described above, the sensors may include a courtesy switch that activates a courtesy lamp that is turned on when the door is open, and an on-off switch that is switched between an on state and an off state in accordance with opening or closing of the door.

Since the sensors include the courtesy switch and the on-off switch, the electronic control unit can appropriately determine that the door is open.

In the control system as described above, the electronic control unit may be configured to execute the automatic parking control, when the vehicle is in at least one state of a brake-off state in which brake operation is not performed by a driver, an accelerator-off state in which accelerator operation is not performed by the driver, a state in which a seat belt of a driver seat is not in use, and a state in which the driver is not seated on the driver seat, in addition to the door open-close determination that the door is open.

With the above configuration, the electronic control unit executes the automatic parking control, when the vehicle is in at least one state of the brake-off state, the accelerator-off state, the state in which the seat belt of the driver seat is not in use, and the state in which the driver is not seated on the driver seat, in addition to the door open-close determination that the door is open. Thus, the electronic control unit can determine, with improved reliability, that the driver is going to get out of the vehicle, or the driver has got out of the vehicle, for example. Consequently, the reliability of the automatic parking control can be further improved.

In the control system as described above, the electronic control unit may be configured to determine that the door is open, as the door open-close determination, only when a vehicle speed is equal to or lower than a predetermined vehicle-stop determination speed.

If the electronic control unit determines that the door is open during traveling, the automatic parking control may be executed when the vehicle is stopped in this condition. On the other hand, with the above configuration, the electronic control unit determines that the door is open, only when the vehicle speed is equal to or lower than the predetermined vehicle-stop determination speed. Therefore, the power transmission system can be prevented from being unintentionally switched to the parking state. Cases whether the electronic control unit determines that the door is open during traveling may include, for example, the case where the door open state is determined due to a failure of a sensor during traveling, the case where the door open state is determined due to a change in the acceleration or yaw rate of the vehicle during traveling with the door half-open, and so forth.

In the control system as described above, the electronic control unit may be configured to determine that the door is open, as the door open-close determination, only when the vehicle is stopped.

In the control system as described above, the electronic control unit may be configured to cause the switching device to switch the power transmission system to the non-parking state, and to be temporarily inhibited from executing the automatic parking control until the door open-close determination indicates that the door is closed, when an operation device is operated to an operation position corresponding to the non-parking state, in a condition where the door open-close determination indicates that the door is open, the operation device being configured to be operated by a driver to a selected one of operation positions corresponding to the parking state and the non-parking state of the power transmission system, respectively.

In the control system as described above, the electronic control unit may be configured to determine that the door is closed, when the open-close signal generated from at least one of the sensors changes from the open signal to the close signal.

With the above configuration, when the operation device is operated to the operation position corresponding to the non-parking state in a condition where the door open-close determination indicates that the door is open, the state of the power transmission system is switched to the non-parking state, and the automatic parking control is temporarily inhibited from being executed until the door open-close determination indicates that the door is closed. Thus, the power transmission system is prevented from being switched to the parking state under the automatic parking control, after it is switched to the non-parking state through operation of the operation device with the door opened with no driver's intention to get out of the vehicle. Also, the electronic control unit determines that the door is closed, when the open-close signal generated by at least one of the two or more sensors for the same door changes from the open signal to the close signal. Thus, the electronic control unit appropriately determines that the door is closed, even when one sensor is stuck in the sensor open state corresponding to the state in which the door is open. As a result, the electronic control unit can appropriately return from the state in which the automatic parking control is temporarily inhibited from being executed, to the state in which the automatic parking control can be executed, by using the door open-close determination indicating that the door is closed. Namely, even when one sensor is stuck in the sensor open state corresponding to the door open state, the automatic parking control is prevented from being kept temporarily inhibited from executed. Consequently, the reliability of the automatic parking control can be improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a view generally illustrating the vehicle to which the disclosure is applied;

FIG. 3 is a view showing the relationship among the actual open-close state of a driver-seat door, open-close signal of each sensor, and door open-close determination, with respect to each state of the sensors;

DETAILED DESCRIPTION OF EMBODIMENTS

One embodiment of the disclosure will be described in detail with reference to the drawings.

Figure 1:
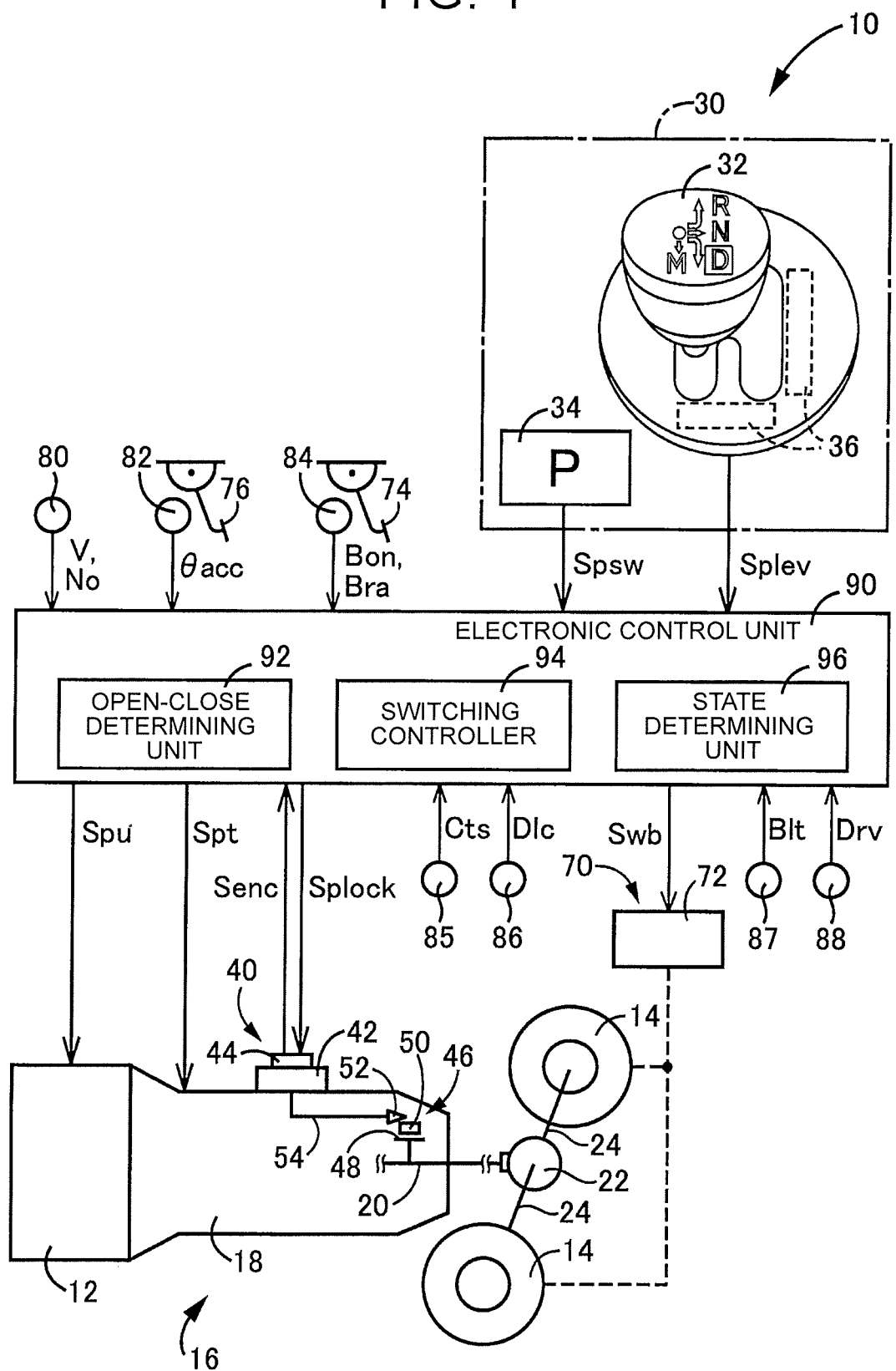
FIG. 1 is a view generally illustrating the configuration of a vehicle to which the disclosure is applied, and illustrating control functions and a principal part of a control system for various controls performed in the vehicle.

FIG. 1 and FIG. 2 generally illustrate the configuration of a vehicle 10 to which the disclosure is applied. FIG. 1 also illustrates control functions and a principal part of a control system for various controls performed in the vehicle 10. In FIG. 1 and FIG. 2, the vehicle 10 includes a power source 12, drive wheels 14, and a power transmission system 16 that transmits power of the power source 12 to the drive wheels 14.

The power source 12 is an engine, such as a gasoline engine or a diesel engine, which generates power by burning fuel, for example. The power source 12 may also be a rotating machine having a function as an electric motor and a function as a generator, for example. The vehicle 10 may include the rotating machine, in addition to the engine, as the power source 12.

The power transmission system 16 includes an automatic transmission 18 coupled to the power source 12, differential gear device 22 coupled to an output shaft 20 as an output rotary member of the automatic transmission 18, right and left axles 24 coupled to the differential gear device 22, and so forth. In the power transmission system 16, power generated from the power source 12 is transmitted to the automatic transmission 18, and transmitted from the automatic transmission 18 to the drive wheels 14 via the differential gear device 22, etc. The output shaft 20 is a rotary member that rotates with the drive wheels 14. The power is synonymous with torque or force when they are not particularly distinguished from each other.

The vehicle 10 further includes a shifting device 30, switching device 40, driver seat 60, driver-seat door 62, driver-seat door lock device 64, driver-seat seat belt 66 as a seat belt for the driver seat 60, courtesy lamp 68 provided on the driver-seat door 62 and/or in a vehicle cabin, wheel brake system 70, and so forth.

The shifting device 30 is an operation device for selecting one of a plurality of shift positions of the automatic transmission 18 through manual operation, namely, operation device that receives a request to change the shift position of the automatic transmission 18 when it is manually operated. The shifting device 30 is operated by the driver to an operation position POSsh corresponding to the selected shift position of the automatic transmission 18. Examples of the operation position POSsh include P, R, N, D, M operation positions. The shift position of the automatic transmission 18 is synonymous with the shift range of the automatic transmission 18.

The P operation position is a parking operation position for selecting the parking position (=P position) of the automatic transmission 18, in which the automatic transmission 18 is placed in a neutral state, and rotation of the output shaft 20 is mechanically inhibited. The neutral state of the automatic transmission 18 is a state in which power transmission in the automatic transmission 18 is cut off, namely, a state in which the automatic transmission 18 is unable to transmit power. The state in which rotation of the output shaft 20 is mechanically inhibited is a parking-lock (=P-lock) state in which the output shaft 20 is nonrotatably fixed, namely, a parking state of the power transmission system 16. The P operation position is an operation position that corresponds to the parking state of the power transmission system 16. The output shaft 20 is nonrotatably fixed by the switching device 40.

The R operation position is a reverse drive operation position for selecting the reverse drive position (=R position) of the automatic transmission 18 which permits the vehicle 10 to travel backward. The N operation position is a neutral operation position for selecting the neutral position (=N position) of the automatic transmission 18 in which the automatic transmission 18 is placed in a neutral state. The D operation position is a forward drive operation position for selecting the forward drive position (=D position) of the automatic transmission 18 which permits the vehicle 10 to travel forward. The M operation position is a manual shift operation position (=M position) that permits manual shifting, namely, permits the gear position of the automatic transmission 18 to be manually shifted by the driver through operation of a paddle switch, or the like, in a condition where the vehicle 10 can travel forward. The neutral state of the automatic transmission 18, and the state in which the vehicle 10 can travel forward or backward, are non-parking-lock states in which the output shaft 20 is permitted to rotate, and correspond to a non-parking state of the power transmission system 16. The R, N, D, M operation positions correspond to the non-parking state of the power transmission system 16, and may also be referred to as non-parking operation positions (=non-P operation positions).

The shifting device 30 has an operator or operators operated by the driver to a selected one of the operation positions POSsh. In this embodiment, the operators are in the form of a shift lever 32 and a P switch 34, for example. Each of the shift lever 32 and the P switch 34 is a momentary-type operator that is returned to the original position when no external force is applied thereto.

The shift lever 32 is operated by the driver to a selected one of the operation positions POSsh corresponding to a desired shift position of the automatic transmission 18, as one of a plurality of non-P positions other than the P position, so that the shift position of the automatic transmission 18 is set to the desired shift position. The non-P positions are shift positions, such as R, N, D, M positions, in which the parking-lock (P-lock) state is released. The P switch 34 is operated by the driver so that the shift position of the automatic transmission 18 is set to the P position. The operation positions POSsh that can be established with the shift lever 32 are, for example, R, N, D, M operation positions, and the operation position POSsh that can be established with the P switch 34 is, for example, the P operation position.

The shifting device 30 includes a lever position sensor 36 that detects the R, N, D, M operation position of the shift lever 32, and outputs a lever position signal Splev indicative of the R, N, D, M operation position, to an electronic control unit 90 that will be described later. The electronic control unit 90 detects operation to the R, N, D, M operation position, based on the lever position signal Splev. The operation to the R, N, D, M operation position is shift operation for changing the shift position of the automatic transmission 18 to the corresponding one of the R, N, D, M positions, and will also be called "shift lever operation".

The P switch 34 is a momentary-type push button switch, and is pushed down to the P operation position by the driver. Each time the P switch 34 is pushed down to the P operation position, a P switch signal Spsw indicative of the P operation position is transmitted to the electronic control unit 90 that will be described later. The electronic control unit 90 detects operation to the P operation position, based on the P switch signal Spsw. The operation to the P operation position is parking shift operation for changing the shift position of the automatic transmission 18 to the P position, and will also be called "P switch operation".

The switching device 40 changes the shift position of the automatic transmission 18 through activation of an electric actuator 42. The switching device 40 includes the electric actuator 42, encoder 44, parking lock mechanism 46, and so forth. The parking lock mechanism 46 includes a parking lock gear 48, parking lock pawl 50, cam 52, parking rod 54, and so forth. The parking lock gear 48 is provided on the output shaft 20 such that it rotates as a unit with the output shaft 20. The parking lock pawl 50 has a pawl portion that engages with gear teeth of the parking lock gear 48, and is able to engage with the parking lock gear 48. The cam 52 is a tapered member provided at a distal end of the parking rod 54 closer to the parking lock pawl 50, and is adapted to be moved toward the parking lock pawl 50 so as to engage the parking lock pawl 50 with the parking lock gear 48. The parking rod 54 supports the cam 52 at its one end portion, and is mechanically coupled at the other end to the electric actuator 42 via a member (not shown). The switching device 40 is a P lock device that switches between a P lock state and a non-P lock state in which the P lock state is released, when the electric actuator 42 is activated based on a P switching control command signal Splock from the electronic control unit 90, and switches the shift position of the automatic transmission 18 between the P position and the non-P positions. For example, when P switching operation at the P switch 34 is detected, the electric actuator 42 is controlled by the electronic control unit 90 so that the cam 52 is biased toward the parking lock pawl 50, so that the parking rod 54 and the cam 52 are operated. As a result, the parking lock pawl 50 is moved toward the parking lock gear 48. When the parking lock pawl 50 is moved to a position where it engages with the parking lock gear 48, the output shaft 20 is nonrotatably fixed along with the parking lock gear 48, and the drive wheels 14 that rotate in association with the output shaft 20 are nonrotatably fixed. In the vehicle 10, the shift position of the automatic transmission 18 is changed, using a "shift by wire" (=SBW) method. Thus, the switching device 40 switches the state of the power transmission system 16 between the parking state and the non-parking state, based on a control command signal from the electronic control unit 90.

The driver-seat door lock device 64 is provided on the driver-seat door 62. The driver-seat door lock device 64 switches the driver-seat door 62 between a locked state and an unlocked state, through normal rotation and reverse rotation of a door lock motor (not shown) incorporated therein.

The wheel brake system 70 is a brake system that applies brake torque as wheel brakes to the wheels. The wheel brake system 70 includes a brake actuator 72, a brake pedal 74, etc. The brake pedal 74 is a brake operation member that is operated by the driver, for applying wheel brakes. The wheel brake system 70 supplies brake hydraulic pressures to wheel cylinders via the brake actuator 72, according to brake operation performed by the driver on the brake pedal 74. In a normal operating mode of the wheel brake system 70, a master cylinder hydraulic pressure that is generated from a brake master cylinder and has a magnitude corresponding to the brake operation amount Bra of the brake pedal 74 is directly supplied as the brake hydraulic pressure to the wheel cylinders. In the meantime, when the wheel brake system 70 is under ABS control, or vehicle speed control, for example, brake hydraulic pressures required for each control are supplied to the wheel cylinders, irrespective of the brake operation amount Bra, so as to generate brake torque from wheel brakes. The wheels are the drive wheels 14 and driven wheels (not shown).

The vehicle 10 is equipped with the electronic control unit 90 as a controller including a control device for the vehicle 10. The electronic control unit 90 includes a so-called microcomputer having CPU, RAM, ROM, input-output interface, and so forth, for example, and the CPU performs various controls on the vehicle 10, by performing signal processing according to programs stored in advance in the ROM, while utilizing the temporary storage function of the RAM. For example, the electronic control unit 90 performs output control of the power source 12, shift control of the automatic transmission 18, switching control of the shift position of the automatic transmission 18 by use of the switching device 40, etc., and is divided as needed into sub-units for output control, shift control, SBW control, and so forth.

The electronic control unit 90 receives various signals, etc. based on detection values obtained by various sensors, etc. included in the vehicle 10. For example, the sensors include the P switch 34, lever position sensor 36, encoder 44, output rotational speed sensor 80, accelerator pedal position sensor 82, brake pedal sensor 84, courtesy switch 85, lock switch 86, seat-belt buckle switch 87, occupant detection sensor 88, and so forth. For example, the signals mentioned above include the P switch signal Spsw, lever position signal Splev, pulse signal Senc for obtaining an encoder count corresponding to the operating position of the electric actuator 42 in the switching device 40, output rotational speed No as the rotational speed of the output shaft 20 corresponding to the vehicle speed V, accelerator pedal stroke θacc as the accelerator operation amount corresponding to the magnitude of an acceleration request made through operation of the accelerator pedal 76 by the driver, brake-on signal Bon as a signal indicating a condition where the brake pedal 74 is operated by the driver, brake operation amount Bra corresponding to the pedal force applied through operation of the brake pedal 74 by the driver, courtesy SW signal Cts as one open-close signal indicating opening or closing of a door of the vehicle 10, lock SW signal Dlc as another open-close signal indicating opening or closing of the door of the vehicle 10, belt signal Blt indicating a condition where the driver-seat seat belt 66 is in use, seating signal Dry indicating a condition where the driver is seated on the driver seat 60, and so forth.

The accelerator pedal 76 is an accelerator operation member that is operated by the driver, and provided in the vehicle 10 for making a request to increase the speed of the vehicle 10. Operation of the accelerator pedal 76 may be called accelerator operation. Operation of the brake pedal 74 may be called brake operation.

The courtesy switch 85 is a sensor that detects opening or closing of the door of the vehicle 10, and is provided on a B pillar in the vicinity of the driver seat 60, for example. The courtesy switch 85 is a switch of which the ON/OFF state is switched according to opening or closing of the driver-seat door 62. The courtesy switch 85 activates the courtesy lamp 68 that is turned on when the driver-seat door 62 is open. The lock switch 86 is a sensor that detects opening or closing of the door of the vehicle 10, and is also an on-off switch of which the ON/OFF state is switched according to opening or closing of the driver-seat door 62. The lock switch 86 is provided in the driver-seat door lock device 64, for example. The courtesy switch 85 and the lock switch 86 are sensors provided for the driver-seat door 62 as the same door.

Various control command signals are generated from the electronic control unit 90 to various devices included in the vehicle 10. For example, the devices include the power source 12, automatic transmission 18, electric actuator 42, brake actuator 72, and so forth. For example, the control command signals include a power source control command signal Spu for controlling the power source 12, transmission control command signal Spt for controlling the automatic transmission 18, P switching control command signal Splock for controlling operation of the switching device 40, wheel brake control command signal Swb for controlling brake torque provided by wheel brakes, and so forth.

The electronic control unit 90 includes an open-close determining unit 92 and a switching controller 94, for implementing various controls in the vehicle 10.

The open-close determining unit 92 makes a door open-close determination as to whether the door of the vehicle 10 is in an open state or in a closed state, using the open-close signals (courtesy SW signal Cts, lock SW signal Dlc) indicating opening or closing of the door of the vehicle 10. In this embodiment, the state in which the door of the vehicle 10 is open will be called "door open state", and the state in which the door of the vehicle 10 is closed will be called "door closed state". The open-close determining unit 92 determines that the door is open, as the door open-close determination, when the open-close state of the door is the door open state, and determines that the door is closed, as the door open-close determination, when the open-close state of the door is the door closed state.

The switching controller 94 electrically switches the shift position of the automatic transmission 18 by means of switching device 40, based on the operation position POSsh of the shifting device 30. More specifically, the switching controller 94 sets a requested position as a shift position of the automatic transmission 18 requested by the driver, based on the lever position signal Splev and the P switch signal Spsw. The switching controller 94 switches the shift position of the automatic transmission 18 to the requested position. When the switching controller 94 detects P switch operation (namely when it receives the P switch signal Spsw) while the shift position is a non-P position, it sets the P position as the requested position, and activates the electric actuator 42 to bring the parking lock mechanism 46 into the P lock state, so as to change the shift position of the automatic transmission 18 from the non-P position to the P position. On the other hand, when the switching controller 94 detects operation to a non-P operation position (namely, when it receives the lever position signal Splev) while the shift position is the P position, it sets a non-P position corresponding to the non-P operation position, as the requested position, and activates the electric actuator 42 to bring the parking lock mechanism 46 into the non-P lock state, so as to change the shift position of the automatic transmission 18 from the P position to the non-P position. In addition, the switching controller 94 switches the shift position to one of the R position, N position, and D position which corresponds to the requested position.

When the open-close determining unit 92 determines that the door is open while the vehicle is stopped with the power transmission system 16 placed in the non-parking state, the switching controller 94 performs automatic parking control for bringing the power transmission system 16 into the parking state by means of the switching device 40. Namely, when the door open-close determination indicates that the door is open while the vehicle is stopped with the automatic transmission 18 placed in the non-P position, the switching controller 94 activates the electric actuator 42 to place the parking lock mechanism 46 in the P lock state, thereby to execute automatic parking control for switching the shift position of the automatic transmission 18 from the non-P position to the P position.

The automatic parking control as described above is control for automatically switching the automatic transmission 18 to the P position by shift by wire, when the driver getting out of the vehicle is detected in a condition where the automatic transmission 18 is in the non-P position. This automatic parking control will be called "driver out-of-vehicle automatic P control". The electronic control unit 90 detects the driver getting out of the vehicle, based on whether the door open-close determination indicates that the door is open. When a sensor that detects opening or closing of the door is stuck in a close position corresponding to the door closed state, it will not be determined that the door is open even if the door is open, with the sensor stuck in this position. In this embodiment, the open-close determining unit 92 determines whether the door is open or closed, by using two sensors, i.e., the courtesy switch 85 and the lock switch 86, for improvement of the reliability of the automatic parking control. The above phrase "stuck in the close position" means a condition where the sensor is stuck in the position corresponding to the door closed state.

Under the automatic parking control as described above, the automatic transmission 18 is automatically shifted to the P position when the door open-close determination indicates that the door is open; thus, this control need not be performed when the driver opens the door with no intention to get out of the vehicle. For example, if the driver opens the door in a situation where the vehicle that has been stopped is moved backward, the automatic parking control is executed in response to opening of the door, and the automatic transmission 18 is shifted to the P position. Then, if the shift lever 32 is operated to the R operation position, the automatic transmission 18 is once shifted to the R position, but shifted to the P position again under the automatic parking control if the door is kept in the open state. On the other hand, in this embodiment, the electronic control unit 90 disables the automatic parking control until the door is once placed in the closed state, after the automatic transmission 18 is shifted from the P position to the non-P position in the door open state.

The switching controller 94 causes the switching device 40 to switch the state of the power transmission system 16 to the non-parking state, when the shifting device 30 is operated to the non-P operation position, in a condition where the open-close determining unit 92 determines that the door is open. Also, the switching controller 94 performs automatic parking disablement control that temporarily inhibits automatic parking control from being executed, until the open-close determining unit 92 determines that the door is closed. The switching controller 94 cancels the automatic parking disablement control, when the open-close determining unit 92 determines that the door is closed, during execution of the automatic parking disablement control.

In the meantime, where the door open-close determination using two sensors, i.e., the courtesy switch 85 and the lock switch 86, indicates that the door is open when either of the two sensors is in a sensor open state corresponding to the door open state, the door open-close determination that the door is closed will not be made if either of the two sensors is stuck in the open position. If the door open-close determination that the door is closed is not made, the automatic parking control may be kept disabled or inhibited. The sensor stuck in the open position means a condition where the sensor is stuck in the sensor open state corresponding to the door open state. While it is desired to improve the reliability of the door open-close determination that the door is open, as a matter of course, it is also desired to improve the reliability of the determination that the door is closed.

The open-close determining unit 92 determines that the door is open, when the open-close signal generated from at least one sensor of the courtesy switch 85 and the lock switch 86 changes from the close signal Dcls corresponding to the door close state to the open signal Dopn corresponding to the door open state. Also, the open-close determining unit 92 determines that the door is closed, when the open-close signal generated from at least one sensor of the courtesy switch 85 and the lock switch 86 changes from the open signal Dopn to the close signal Dcls.

FIG. 3 shows the relationship among the actual open or closed state of the driver-seat door 62, open-close signal generated by each sensor, and door open-close determination, with respect to each state of the sensors. In FIG. 3, "ACTUAL DOOR STATE" indicates the actual open or closed state of the driver-seat door 62. "OPEN" in the actual door state indicates the door open state, and "CLOSE" indicates the door closed state. "LOCK SW" denotes the lock switch 86, and "COURTESY SW" denotes the courtesy switch 85. "LOCK SW SIGNAL" and "COURTESY SW SIGNAL" indicate the open-close signals generated by the respective sensors (the lock switch 86, the courtesy switch 85). "OPEN" in the "LOCK SW SIGNAL" and "COURTESY SW SIGNAL" indicates the open signal Dopn, and "CLOSE" indicates the close signal Dcls. "OPEN" in the door open-close determination indicates that the door is open, and "CLOSE" indicates that the door is closed. When both of the courtesy switch 85 and the lock switch 86 are normal, the open-close signal generated by each sensor changes in accordance with change of the actual door state; therefore, when the open-close signal changes, the door open-close determination is switched in accordance with the open-close signal that has been changed. When the lock switch 86 is stuck in a certain position, the lock SW signal Dlc does not change, but the courtesy SW signal Cts changes in accordance with change of the actual door state; thus, when the courtesy SW signal Cts changes, the door open-close determination is switched in accordance with the courtesy SW signal Cts that has been changed. When the courtesy switch 85 is stuck in a certain position, the courtesy SW signal Cts does not change, but the lock SW signal Dlc changes in accordance with change of the actual door state; thus, when the lock SW signal Dlc changes, the door open-close determination is switched in accordance with the lock SW signal Dlc that has been changed.

Figure 4:
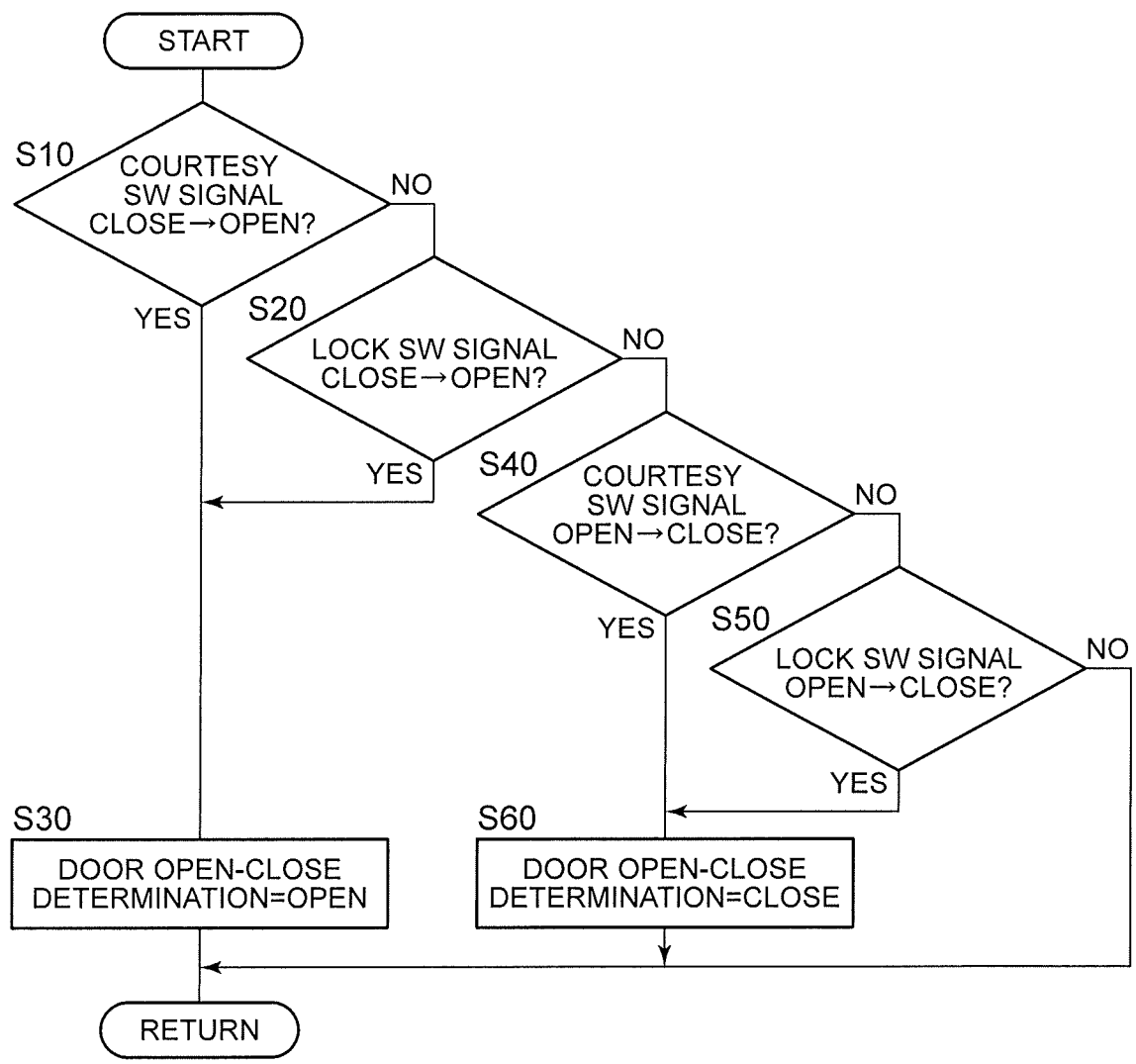
FIG. 4 is a flowchart illustrating a principal part of control operation of an electronic control unit, namely, control operation for improving the reliability of automatic parking control.

FIG. 4 is a flowchart illustrating a principal part of control operation of the electronic control unit 90, namely, control operation for improving the reliability of automatic parking control. A control routine in the flowchart of FIG. 4 is repeatedly executed, for example.

In FIG. 4, initially, the open-close determining unit 92 determines in step S10 whether the courtesy SW signal Cts has changed from the close signal Dcls to the open signal Dopn. When a negative decision (NO) is obtained in step S10, the open-close determining unit 92 determines in step S20 whether the lock SW signal Dlc has changed from the close signal Dcls to the open signal Dopn. When an affirmative decision (YES) is obtained in step S10 or an affirmative decision (YES) is obtained in step S20, the open-close determining unit 92 determines in step S30 that the door is open. When a negative decision (NO) is obtained in step S20, the open-close determining unit 92 determines in step S40 whether the courtesy SW signal Cts has changed from the open signal Dopn to the close signal Dcls. When a negative decision (NO) is obtained in step S40, the open-close determining unit 92 determines in step S50 whether the lock SW signal Dlc has changed from the open signal Dopn to the close signal Dcls. When a negative decision (NO) is obtained in step S50, the current cycle of the routine ends. When an affirmative decision (YES) is obtained in step S40 or an affirmative decision (YES) is obtained in step S50, the open-close determining unit 92 determines in step S60 that the door is closed.

In order to improve the reliability with which it is determined that the driver gets out of the vehicle 10 or the driver has got out of the vehicle 10, the driver getting out of the vehicle may be detected, using another condition, in addition to the door open-close determination that the door is open. The other condition may be a brake-off state in which no brake operation is performed by the driver, for example. The other condition may be an accelerator-off state in which no accelerator operation is performed by the driver, for example. The other condition may be a state in which the driver-seat seat belt 66 is not in use, for example. The other condition may be a state in which the driver is not seated on the driver seat 60, for example.

The switching controller 94 executes automatic parking control, when the vehicle 10 is in at least one state of the brake-off state, accelerator-off state, state in which the driver-seat seat belt 66 is not in use, and the state in which the driver is not seated on the driver seat 60, in addition to the door open-close determination that the door is open, while the vehicle is stopped with the automatic transmission 18 placed in a non-P position.

When the open-close determining unit 92 determines that the door is open during traveling, the automatic parking control may be carried out when the vehicle is stopped while it is kept determined that the door is open. Cases where it is determined that the door is open during traveling may include the case where the open-close signal is changed from the close signal Dcls to the open signal Dopn due to a failure of either one of the courtesy switch 85 and the lock switch 86 during traveling, and it is determined that the door is open, and the case where the open-close signal is changed from the close signal Dcls to the open signal Dopn due to change of the acceleration or yaw rate of the vehicle 10 during traveling with the door half-open, and it is determined that the door is open, for example. Thus, the cases where it is determined that the door is open may be limited to those during stop of the vehicle.

The open-close determining unit 92 determines that the door is open, only when the vehicle speed V is equal to or lower than a predetermined vehicle-stop determination speed Vth. The predetermined vehicle-stop determination speed Vth is a predetermined threshold value based on which stop of the vehicle can be determined, in view of a response delay of the vehicle speed V based on the detection value of the output rotational speed sensor 80, in response to reduction of the actual vehicle speed V at the time of sudden vehicle stop, for example.

The electronic control unit 90 further includes a state determining unit 96, so as to further improve the reliability of automatic parking control.

The state determining unit 96 determines whether the vehicle speed V is equal to or lower than the predetermined vehicle-stop determination speed Vth. The state determining unit 96 determines whether the shift position of the automatic transmission 18 is a non-P position. The state determining unit 96 determines whether the vehicle 10 is in the brake-off state.

The switching controller 94 executes automatic parking control, in the case where the open-close determining unit 92 determines that the door is open and the state determining unit 96 determines that the vehicle 10 is in the brake-off state, when the state determining unit 96 determines that the vehicle speed V is equal to or lower than the predetermined vehicle-stop determination speed Vth, and the shift position of the automatic transmission 18 is the non-P position.

When the open-close determining unit 92 determines that the door is open, and it is determined that the operation position POSsh is a non-P operation position, the switching controller 94 sets the shift position of the automatic transmission 18 to the corresponding non-P position, and executes automatic parking disablement control. When the open-close determining unit 92 determines that the door is closed, during execution of the automatic parking disablement control, the switching controller 94 cancels the automatic parking disablement control.

Figure 5:
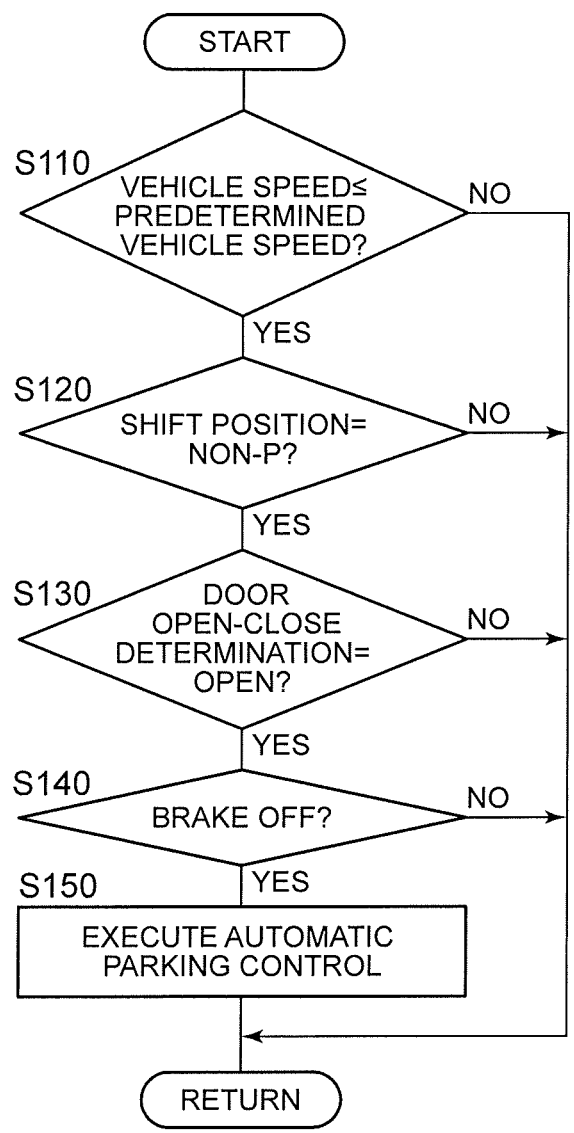
FIG. 5 is a flowchart illustrating a principal part of control operation of the electronic control unit, namely, control operation for executing automatic parking control.

FIG. 5 is a flowchart illustrating a principal part of control operation of the electronic control unit 90, namely, control operation for executing automatic parking control. A control routine in the flowchart of FIG. 5 is repeatedly executed, for example.

In FIG. 5, initially, the state determining unit 96 determines in step S110 whether the vehicle speed V is equal to or lower than the predetermined vehicle-stop determination speed Vth. When a negative decision (NO) is obtained in step S110, the current cycle of this routine ends. When an affirmative decision (YES) is obtained in step S110, the state determining unit 96 determines in step S120 whether the shift position of the automatic transmission 18 is a non-P position. When a negative decision (NO) is obtained in step S120, the current cycle of this routine ends. When an affirmative decision (YES) is obtained in step S120, the open-close determining unit 92 determines in step S130 whether the door is open. When a negative decision (NO) is obtained in step S130, the current cycle of this routine ends. When an affirmative decision (YES) is obtained in step S130, the state determining unit 96 determines in step S140 whether the vehicle 10 is in the brake-off state. When a negative decision (NO) is obtained in step S140, the current cycle of this routine ends. When an affirmative decision (YES) is obtained in step S140, the switching controller 94 executes automatic parking control in step S150.

Figure 6:
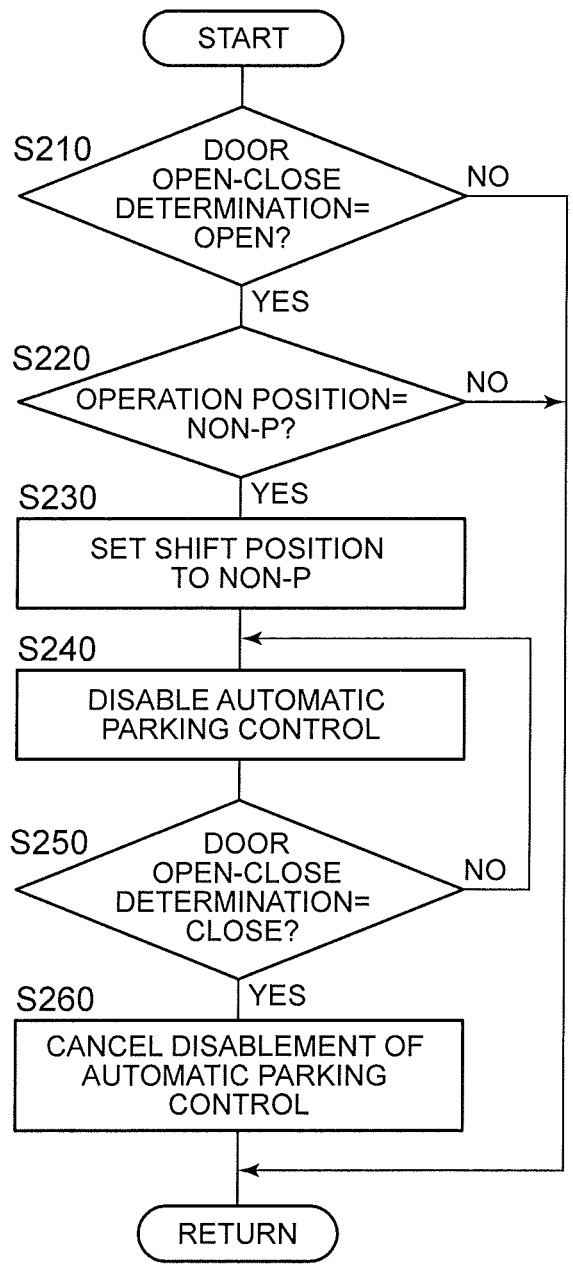
FIG. 6 is a flowchart illustrating a principal part of control operation of the electronic control unit, namely, control operation for executing automatic parking disablement control and cancelling the automatic parking disablement control.

FIG. 6 is a flowchart illustrating a principal part of control operation of the electronic control unit 90, namely, control operation for performing automatic parking disablement control and cancelling the automatic parking disablement control. A control routine in the flowchart of FIG. 6 is repeatedly executed, for example.

In FIG. 6, initially, the open-close determining unit 92 determines in step S210 whether the door is open. When a negative decision (NO) is obtained in step S210, the current cycle of this routine ends. When an affirmative decision (YES) is obtained in step S210, the switching controller 94 determines in step S220 whether the operation position POSsh is a non-P operation position. When a negative decision (NO) is obtained in step S220, the current cycle of this routine ends. When an affirmative decision (YES) is obtained in step S220, the switching controller 94 sets the shift position of the automatic transmission 18 to the corresponding non-P position in step S230. Then, in step S240, the switching controller 94 executes automatic parking disablement control. Then, the open-close determining unit 92 determines in step S250 whether the door is closed. When a negative decision (NO) is obtained in step S250, the control returns to step S240. When an affirmative decision (YES) is obtained in step S250, the switching controller 94 cancels the automatic parking disablement control in step S260.

As described above, according to this embodiment, it is determined that the door is open, when the open-close signal generated by at least one sensor of the courtesy switch 85 and the lock switch 86 changes from the close signal Dcls to the open signal Dopn. Thus, even when one of the courtesy switch 85 and the lock switch 86 is stuck in a position corresponding to the door closed state, it is appropriately determined that the door is open. Thus, it is possible to improve the reliability of automatic parking control executed using the determination that the door is open.

In this embodiment, the sensors provided for the driver-seat door 62 as the same door include the courtesy switch 85 and the lock switch 86; therefore, it is appropriately determined that the door is open.

According to this embodiment, automatic parking control is executed when the vehicle 10 is in at least one state of the brake-off state, accelerator-off state, state in which the driver-seat seat belt 66 is not in use, and the state in which the driver is not seated on the driver seat 60, in addition to the determination that the door is open. Thus, it can be determined with improved reliability that the driver gets out of the vehicle 10 or has got out of the vehicle 10. Accordingly, the reliability of the automatic parking control can be further improved.

According to this embodiment, the determination that the door is open is made, only when the vehicle speed V is equal to or lower than the predetermined vehicle-stop determination speed Vth. This makes it possible to prevent the shift position of the automatic transmission 18 from being unintentionally switched to the P position.

According to this embodiment, when the shifting device 30 is operated to a non-P operation position, in a condition where it is determined that the door is open, the shift position of the automatic transmission 18 is changed to the corresponding non-P position, and the automatic parking disablement control is performed until it is determined that the door is closed. Thus, the shift position of the automatic transmission 18 is prevented from being changed to the P position under automatic parking control, after the shift position is changed to the non-P position via operation of the shifting device 30 in a condition where the door is open with no driver's intention to get out of the vehicle. Also, the open-close determining unit 92 determines that the door is closed, when the open-close signal generated from at least one sensor of the courtesy switch 85 and the lock switch 86 changes from the open signal Dopn to the close signal Dcls; therefore, even when one of the courtesy switch 85 and the lock switch 86 is stuck in a position corresponding to the door open state, the open-close determining unit 92 appropriately determines that the door is closed. Thus, the automatic parking disablement control can be appropriately cancelled, using the determination that the door is closed. Namely, the automatic parking control is prevented from being kept disabled, even if one of the sensors is stuck in the position corresponding to the door open state. Consequently, the reliability of the automatic parking control can be improved.

While the embodiment of the disclosure has been described in detail with reference to the drawings, the disclosure may be embodied in other forms.

For example, in the above embodiment, the courtesy switch 85 and lock switch 86 provided for the driver-seat door 62 are illustrated by way of example, as a plurality of sensors for the same door. However, the disclosure is not limited to this arrangement. For example, three or more sensors that detect opening or closing of the driver-seat door 62 may be provided for the driver-seat door 62. Also, a plurality of sensors that detects opening or closing of a door may be provided, for each door of the passenger seat and rear seats, in addition to those provided for the driver-seat door 62. In this case, the door open-close determination is made with respect to each of the doors, and automatic parking control is executed, when it is determined, as a necessary condition, that any of the doors is open. The provision of the sensors for each door of the passenger seat and rear seats is useful in the case where the driver gets out of the vehicle, through a door other than the driver-seat door 62.

In the above embodiment, the order of execution of steps S10, S20, S40, S50 of FIG. 4 may be changed Regarding execution of automatic parking control, steps S40, S50, S60 of FIG. 4 are not necessarily required. Also, in step S140 of FIG. 5, it may be determined whether the vehicle is in at least one state of the accelerator-off state, state in which the driver-seat seat belt 66 is not in use, and the state in which the driver is not seated on the driver seat 60, in place of or in addition to the determination as to whether the vehicle is in the brake-off state. Or step S140 of FIG. 5 may not be provided.

While the shifting device 30 includes two operators, i.e., the shift lever 32 and the P switch 34, in the above embodiment, it is not limited to this form. For example, the shifting device 30 may include operation positions, such as P, R, N, and D, corresponding to the respective shift positions of the automatic transmission 18, one operator, such as a lever or an indicator, which is operated to one of the operation positions, and a position sensor that electrically detects operation of the operator to each operation position.

While the switching device 40 switches the shift position of the automatic transmission 18 between the P position and the non-P position in the above embodiment, the switching device of the disclosure is not limited to this form. For example, the switching device 40 may switch the shift position of the automatic transmission 18 to each position of the P, R, N, D positions, for example.

In the above embodiment, the vehicle 10 may be a vehicle that does not include the automatic transmission 18, for example, a vehicle that has no automatic transmission in a series-type hybrid vehicle, or an electric vehicle capable of traveling with a motor by driving a rotating machine for driving (motor) with electric power of a battery. In sum, the disclosure may be applied to any type of vehicle, provided that the vehicle includes a power transmission system that transmits power of a power source to drive wheels, and a switching device that switches the power transmission system between a parking state and a non-parking state, based on a control command signal.

The illustrated embodiment is a mere exemplary one, and the disclosure may be embodied with various changes or improvements, based on the knowledge of those skilled in the art.

What is claimed is:

1. A control system for a vehicle, the vehicle including a power transmission system that transmits power of a power source to drive wheels, and a switching device that switches the power transmission system between a parking state in which rotation of a rotary member that rotates with the drive wheels is mechanically inhibited, and a non-parking state in which rotation of the rotary member is permitted, based on a control command signal, the control system comprising:

an electronic control unit configured to make a door open-close determination to determine whether a door of the vehicle is open or the door is closed, using an open-close signal indicating opening or closing of the door, the electronic control unit being configured to execute automatic parking control by causing the switching device to switch the power transmission system to the parking state, when the door open-close determination indicates that the door is open, while the vehicle is stopped with the power transmission system placed in the non-parking state, and the electronic control unit being configured to determine that the door is open as the door open-close determination, when the open-close signal generated from at least one of a plurality of sensors provided for the same door changes from a close signal indicating that the door is closed, to an open signal indicating that the door is open, the plurality of sensors being configured to detect opening or closing of the same door, and to generate the open-close signal.

2. The control system according to claim 1, wherein the sensors include a courtesy switch that activates a courtesy lamp that is turned on when the door is open, and an on-off switch that is switched between an on state and an off state in accordance with opening or closing of the door.

3. The control system according to claim 1, wherein the electronic control unit is configured to execute the automatic parking control, when the vehicle is in at least one state of a brake-off state in which brake operation is not performed by a driver, an accelerator-off state in which accelerator operation is not performed by the driver, a state in which a seat belt of a driver seat is not in use, and a state in which the driver is not seated on the driver seat, in addition to the door open-close determination that the door is open.

4. The control system according to claim 1, wherein the electronic control unit is configured to determine that the door is open, as the door open-close determination, only when a vehicle speed is equal to or lower than a predetermined vehicle-stop determination speed.

5. The control system according to claim 1, wherein the electronic control unit is configured to determine that the door is open, as the door open-close determination, only when the vehicle is stopped.

6. The control system according to claim 1, wherein, the electronic control unit is configured to cause the switching device to switch the power transmission system to the non-parking state, and to be temporarily inhibited from executing the automatic parking control until the door open-close determination indicates that the door is closed, when an operation device is operated to an operation position corresponding to the non-parking state, in a condition where the door open-close determination indicates that the door is open, the operation device being configured to be operated by a driver to a selected one of operation positions corresponding to the parking state and the non-parking state of the power transmission system, respectively.

7. The control system according to claim 6, wherein the electronic control unit is configured to determine that the door is closed, when the open-close signal generated from at least one of the sensors changes from the open signal to the close signal.

* * * * *